W. H. FOX.
CONVERTIBLE SLED AND COASTER.
APPLICATION FILED JULY 31, 1914.

1,135,889.

Patented Apr. 13, 1915.
2 SHEETS—SHEET 1.

Witnesses
Frederick R. Moran
J. W. Garnier

Inventor
William H. Fox
By Victor J. Evans
Attorney

W. H. FOX.
CONVERTIBLE SLED AND COASTER.
APPLICATION FILED JULY 31, 1914.
1,135,889.
Patented Apr. 13, 1915.
2 SHEETS—SHEET 2.
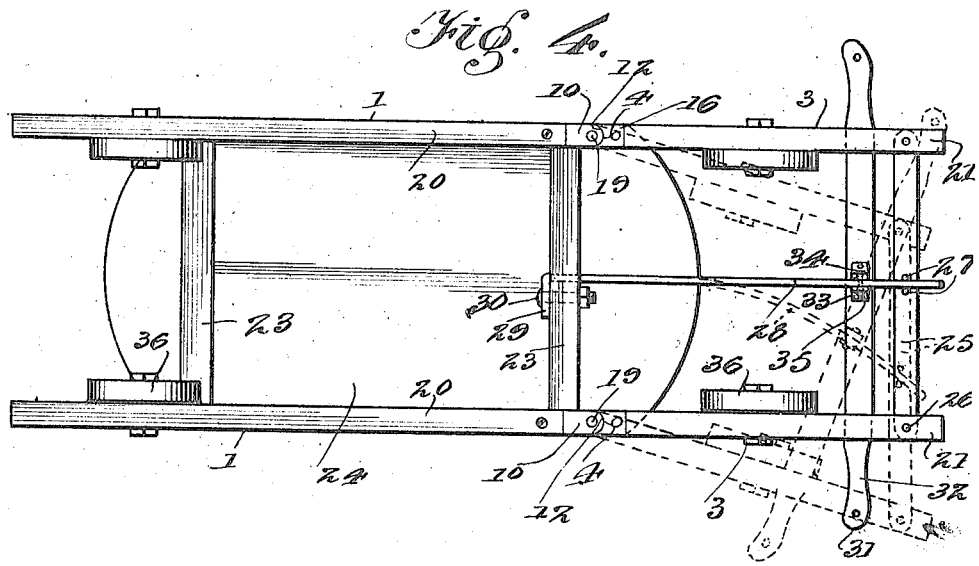
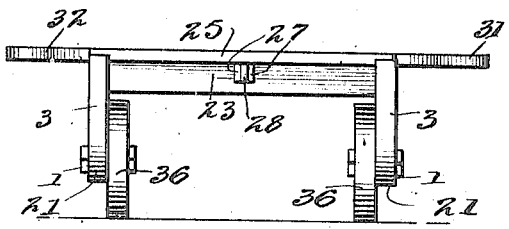
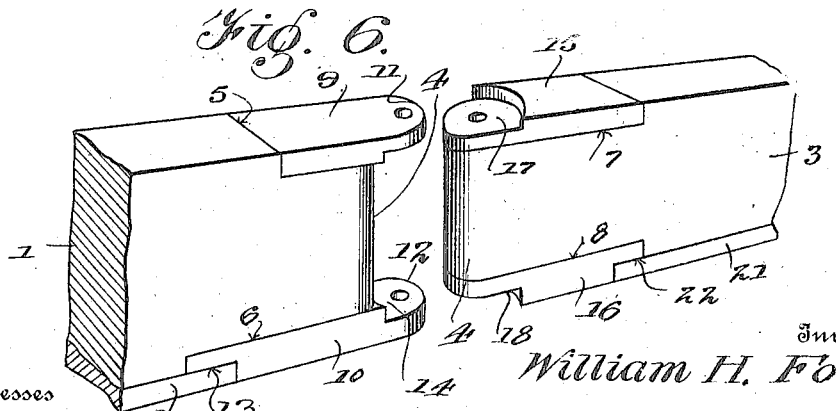
Witnesses
Frederick R. Moran
J. W. Garner
Inventor
William H. Fox
By Victor J. Evans
Attorney

UNITED STATES PATENT OFFICE.

WILLIAM H. FOX, OF YONKERS, NEW YORK.

CONVERTIBLE SLED AND COASTER.

1,135,889.   Specification of Letters Patent.   Patented Apr. 13, 1915.

Application filed July 31, 1914. Serial No. 854,326.

*To all whom it may concern:*

Be it known that I, WILLIAM H. FOX, a citizen of the United States, residing at Yonkers, in the county of Westchester and State of New York, have invented new and useful Improvements in Convertible Sleds and Coasters, of which the following is a specification.

This invention is an improved convertible sled and coaster in which the runners are provided with hinged steering members at their front ends that are adapted to be turned as desired to direct the sled when coasting and in which a steering arm is also provided which is connected to the steering members of the runners and a spring is arranged to act on the steering arm of the sled so as to normally hold the steering members of the runners straight and thus ordinarily guide the sled in a straight course, the spring however, enabling the steering members of the runners to be readily turned as desired by the steering arm.

The invention consists in the construction, combination and arrangement of devices hereinafter described and claimed.

Figure 1:
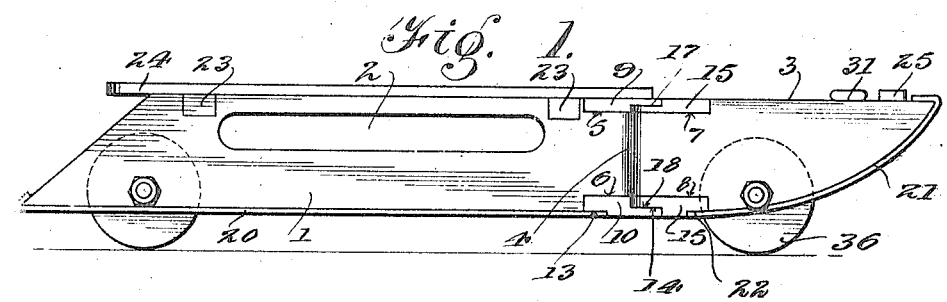
Figure 3:
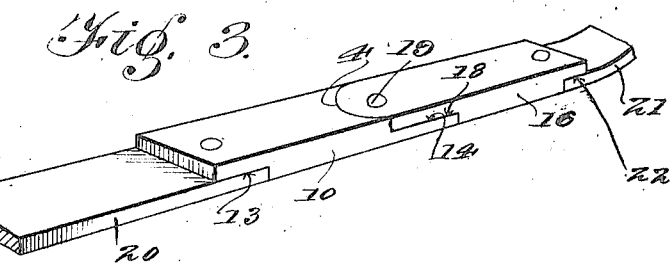
Figure 2:
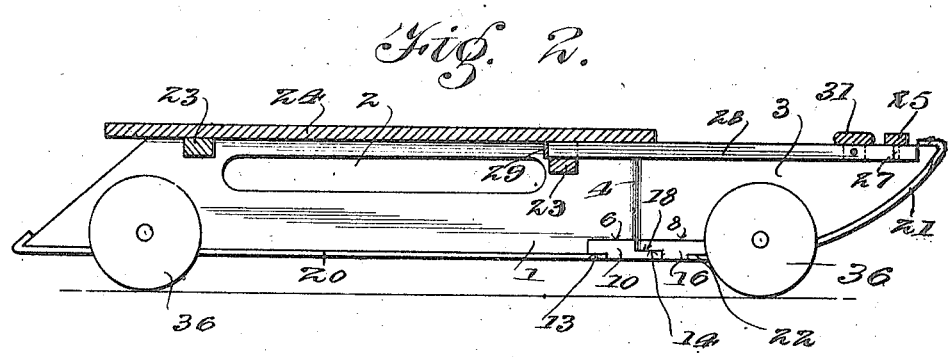

In the accompanying drawings:—Figure 1 is a side elevation of a sled constructed in accordance with my invention. Fig. 2 is a vertical longitudinal sectional view of the same. Fig. 3 is a detail perspective view of the hinge members which connect one of the runners and its steering member together. Fig. 4 is an inverted plan of the sled, showing the steering members in one position in full lines and in another position in dotted lines. Fig. 5 is a front elevation of the sled. Fig. 6 is a detail perspective view of portions of one of the runners showing the same disconnected from each other.

The runners 1 of my improved convertible sled and coaster are preferably made of wood but may be made of any suitable material and each runner is here shown as having a longitudinal slot 2 near its upper side to enable the user or users of the sled to grasp the sides thereof and hold on while coasting. Each runner is provided at its front end with a steering member 3 which is pivotally connected thereto for angular movement in a horizontal plane so that the steering members may be turned to right or left as desired when guiding the sled. Th meeting ends of each runner and its steering member are rounded as at 4 and as shown in detail in Fig. 6 and are respectively provided in their upper and lower sides with rabbets 5—6 7—8. Hinge members 9—10 are respectively secured in the rabbets 5—6 of the runners 1 and project forwardly therefrom, and projecting front ends being semi-circular as at 11—12. The members 10 are thicker than the members 9 and are provided with rabbets 13 in their rear lower corners and their projecting ends 12 have a semi-circular rabbet 14 in their upper sides. Hinge members 15—16 are respectively secured in the rabbets 7—8 of the steering members 3 of the runners and have their rear ends semi-circular in form and are respectively provided in their upper and lower sides with rabbets 17—18 which respectively receive the projecting ends 11—12 of the members 9—10, thereby forming overlapping connections between the said hinge members. Pintle or pivot rods 19 pass through alined vertical openings in the overlapping portions of the hinge members and in the rear portions of the steering members of the runners and hence said steering members are hingedly or pivotally connected to the runners so that they may be arranged either in line therewith or at any desired angle thereto to guide the sled in any direction. Each runner 1 has a shoe 20 on its lower edge and the front end of said shoe is secured in the rabbet 13 of the hinge member 10. Each steering member 3 has a shoe 21 the rear end of which is secured in the rabbet 22 in the lower side and at the front end of the hinge member 16. Some of the screws or other devices which secure the hinge members to the members of the runners also secure the ends of the shoes, as shown.

The main members 1 of the runners are connected together by the usual cross bars 23 and the usual board or platform 24 is secured on said cross bars and on the upper edges of the main members of the runners.

The front ends of the steering members 3 of the runners are connected together by a guide bar 25 which is pivotally connected to the upper sides thereof as at 26. On the under side of the guide bar, at its center, are a pair of depending lugs 27 between which a slot is formed for the reception of the front portion of a straight spring bar 28. The rear portion of this spring bar passes through a longitudinal slot in the center of the front cross bar 23 and has a laterally bent portion 29 which bears against the rear side of said cross bar and is secured thereto by a bolt 30 so that the spring bar has its rear end strongly braced. This spring bar acts on the steering members of the runners, through the guide bar to which its upper front end is slidably connected, to normally keep the steering members in line with the main members of the runners and hence direct the sled straight ahead under ordinary conditions. To enable the sled to be readily turned to either side I provide a steering bar 31 which bears on the upper sides of the steering members 3 of the runner, near the front ends thereof, projects beyond opposite sides thereof and is shaped to form handles 32 and to the under side of said steering bar, at its center is secured a keeper 33 which has a slot 34 through which the spring bar extends and a bolt 35 to clamp said keeper securely to the spring bar. By turning the steering bar the spring bar may be flexed and caused to turn the steering members in any desired direction, as will be understood.

Wheels 36 may be arranged on the inner sides of the runners and their steering members as shown to adapt the sled for use when there is no snow or ice.

Having thus described my invention, I claim:—

1. A sled having runners provided with pivotally mounted steering members, a spacing bar having its ends pivotally connected to the front portions of said steering members, a spring connected to said steering members, and acting to normally hold them in line with the runners and a steering bar extending across and bearing on the steering members attached at its center directly to the spring and adapted to be used to flex the spring to turn the steering members in any direction desired.

2. A sled having runners provided with pivotally mounted steering members, a guide bar pivotally connected to the steering members, a spring bar attached to the body of the sled and slidably connected to said guide bar and a steering bar extending across and bearing on the steering members attached at its center directly to the spring bar and adapted to be used to flex the spring bar and cause the steering members to be turned as desired.

In testimony whereof I affix my signature in presence of two witnesses.

WILLIAM H. FOX.

Witnesses:
MELVIN MELINE,
THOMAS PRESCOTT.